United States Patent [19]
Lane

[11] 3,887,743
[45] June 3, 1975

[54] UNITARY PLASTIC LAMINATE

[75] Inventor: William C. Lane, Chillicothe, Ohio

[73] Assignee: The Mead Corporation, Dayton, Ohio

[22] Filed: Nov. 9, 1972

[21] Appl. No.: 305,170

[52] U.S. Cl. ............... 428/206; 428/327; 428/503; 428/505
[51] Int. Cl. ............................................. B44f 1/00
[58] Field of Search .............. 161/5, 413, 248, 263; 260/80.75; 162/164

[56] References Cited
UNITED STATES PATENTS

| | | |
|---|---|---|
| 2,658,828 | 10/1953 | Pattilloch ............................ 162/164 |
| 2,777,832 | 5/1951 | Mallison ........................... 260/80.73 |
| 3,220,916 | 11/1965 | Petropoulos ......................... 161/413 |
| 3,547,769 | 1/1970 | Albrinck et al. ..................... 161/413 |
| 3,734,807 | 5/1973 | Kelly et al. ............................ 161/5 |
| 3,736,220 | 5/1973 | Shah ................................. 161/413 |

Primary Examiner—Mayer Weinblatt
Assistant Examiner—Edith L. Rollins
Attorney, Agent, or Firm—Earl B. Brookbank, Jr.

[57] ABSTRACT

Plastic laminates are prepared using decor layers containing 10–25% of particulate polyacrylonitrile resin, the polyacrylonitrile resin being incorporated in the decor during its manufacture on a paper machine. The laminates meet NEMA specifications even though less resin is used and fewer process steps are required.

5 Claims, 2 Drawing Figures

UNITARY PLASTIC LAMINATE

BACKGROUND OF THE INVENTION

1. Field of the Invention

The field of the present invention is that of plastic laminates wherein a core or base is covered with a resin-containing decorative surface layer, termed decor, which in turn is covered with a resin impregnated wear layer called an overlay. The core may comprise multiple layers of resin impregnated paper. The finished plastic laminate is a unitary structure suitable for use as table and counter tops, wall panels and the like. Generally, this invention is concerned with a novel decor, method of producing a laminate therefrom, and to the laminate so produced.

2. Description of the Prior Art

Presently, plastic laminates of the type herein considered are generally prepared by (1) assembling a number of core paper sheets which have been saturated with about 30% of phenolaldehyde condensation polymer in "B" stage; (2) covering the core sheets with an opaque decorated paper, called a decor, containing from 30 to 42% of an aminoplast such as a melamine-formaldehyde resin; and (3) applying over the decor an overlay paper containing from 65 to 75% of a melamine aldehyde resin. The assembly of core sheets, decor and overlay is then subjected to heat and pressure to consolidate them into a unitary structure, and to complete the cure of the resins therein to an insoluble, infusible state.

According to the prior art, core stock, decor and overlay papers are manufactured according to conventional papermaking methods. If desired, decor sheets are first printed with a design or pattern but in any event are passed through a machine called a treater in which the decor paper is saturated with aminoplast resin. Similar processing on a treater is required to incorporate the desired kind and amount of resin into the core stock and overlay papers.

Such prior art laminates have been known for a long time, and over the years, there have been various improvements in resins used, in the manufacture of the decor paper to add post forming properties to the laminates, and a variety of overlay papers have been produced to increase the wear resistance of the finished laminates.

On the other hand, the necessary process steps have shown little or no change, and in total, there has been little reduction, if any, in the cost of such laminates.

SUMMARY OF THE INVENTION

According to the present invention, laminates are produced with elimination of one of the prior art process steps and with a significant reduction in the amount of resin used in producing the finished laminate.

As shown in FIG. 2, this is accomplished by incorporating from 10 to 25% of particulate polyacrylonitrile resin in the decor at the time the decor is manufactured on the papermachine, the amount of particulate resin used being a function of the basis weight of the decor, as will be explained later herein. This decor may then be printed, if desired, with no loss in print quality and converted to a laminate without further addition of resin to the decor. Conventional core stock and overlays are used.

It is indeed unexpected that a 65 lb./3000 sq. ft. decor for example, having only about one-half the amount of resin (20% of polyacrylonitrile compared to 30–42% melamineformaldehyde of the prior art) can be made into a laminate which meets all the NEMA specifications for Type A and Type C laminates. Even more surprising is the discovery that a 37.5 lb./3000 sq. ft. decor containing only 10% by weight of particulate polyacrylonitrile, when made into a laminate with conventional core stock and overlay, will meet the same NEMA specifications. Substantial economy is achieved in producing the laminates of this invention by eliminating the step of impregnating the decor sheet with resin on a treater, and by reason of the substantial reduction in the amount of resin incorporated in the decor.

DETAILED DESCRIPTION

Figure 1:
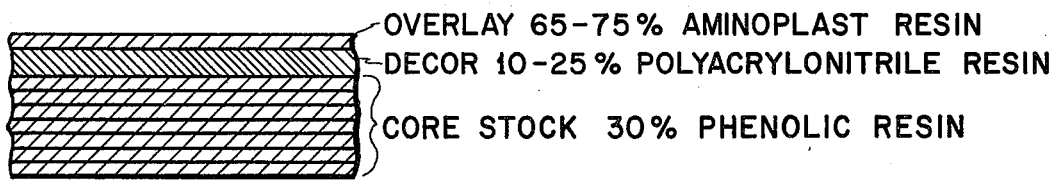
FIG. 1 is an enlarged diagrammatic sectional elevation of a typical laminate of this invention.
Figure 2:
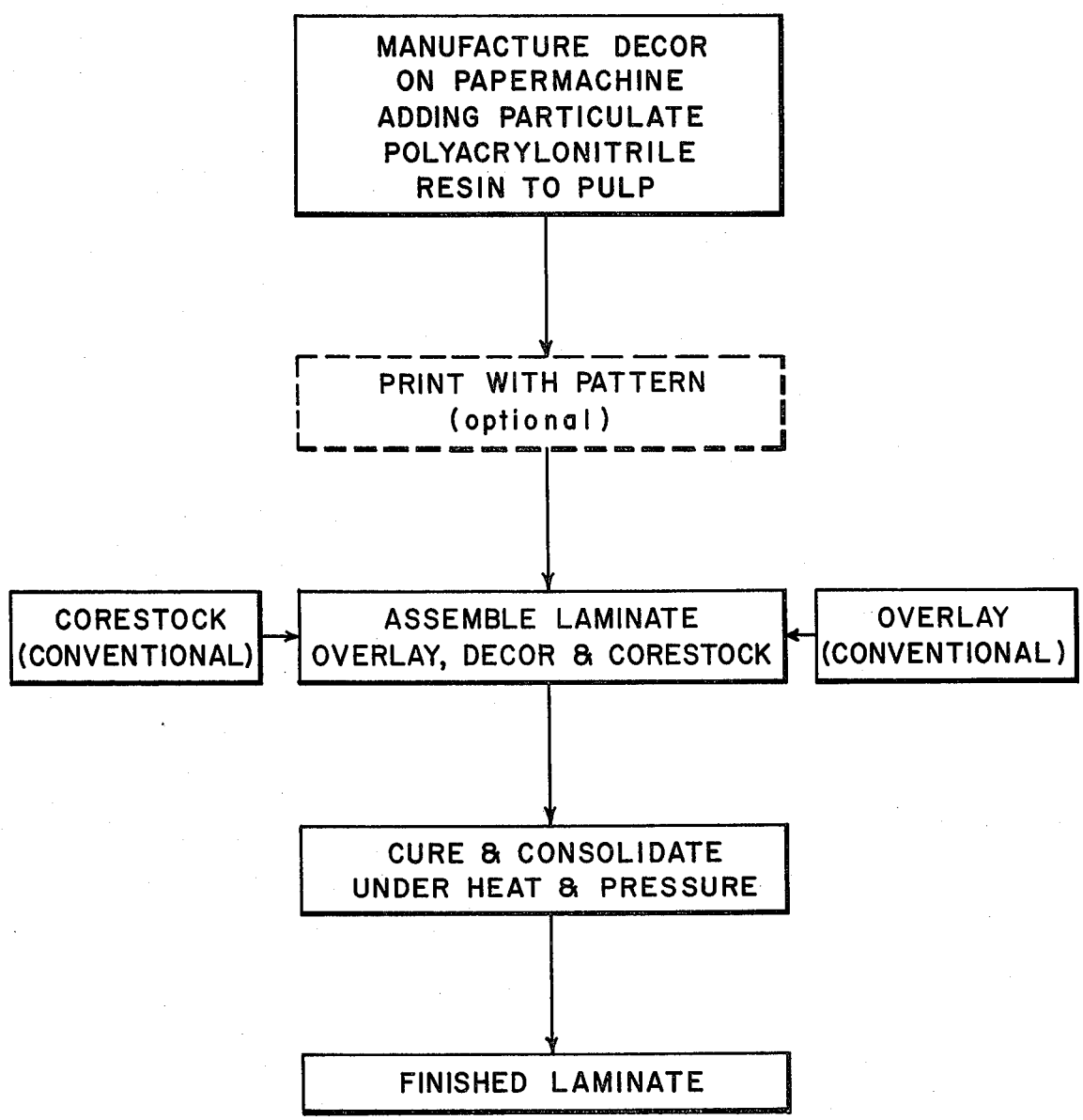
FIG. 2 is a flow-sheet showing the method of producing the laminate of FIG. 1.

The laminates of the present invention utilize core stock and overlays which are conventional in the art. The decor used in the laminate is produced on a conventional papermachine with addition of a particulate polyacrylonitrile resin to yield a resin content of 10 to 25%, depending in part on the basic weight of the decor. This decor may be incorporated into a laminate without further addition of resin, using core stock and overlay of the prior art. By contrast, prior art decors are most often impregnated in a separate operation with 30 to 42% of a melamine-aldehyde resin.

A suitable polyacrylonitrile resin is of the type disclosed in U.S. Pat. No. 2,777,832 and preferably is a copolymer of 95% acrylonitrile and 5% methylacrylate with a uniform average molecular weight of between about 60,000 and 90,000. As produced according to U.S. Pat. No. 2,777,832, the resin is in the form of extremely compact rounded discrete particles ranging in size from 10 to 50 microns diameter. The resin particles may be added to decor paper pulp and filler slurries without further size reduction, even though the size range of 10 to 50 microns is usually considered coarse in terms of conventional papermaking. Using unground resin particles of 10 to 50 micron size range will result in a rough paper surface with attendant reduction in printing quality unless increased pressing and calendering are used.

If desired, the polyacrylonitrile resin particles may be reduced to a smaller particle size range, such as by wet grinding in slurry form. The ground slurry may then be mixed with the other decor paper furnish components to yield the desired 10 to 25% of the polymer, by weight, based on the total weight of the decor paper.

As used herein, the polyacrylonitrile resins are polymers containing at least 85% by weight of acrylonitrile units. These include copolymers, including binary and ternary polymers containing at least 85% by weight of acrylonitrile in the polymer molecule, or a blend comprising polyacrylonitrile and copolymers comprising acrylonitrile with from 2 to 50% of another polymeric material, the blend having an overall polymerized acrylonitrile content of at least 85% by weight.

For example, the polymer may be a copolymer of from 85 to 98% acrylonitrile and from 2 to 15% of another monomer containing the >C=C< linkage and copolymerizable with acrylonitrile. Suitable monoolefinic monomers, include acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alphachloroacrylic acids; vinyl chloride, vinyl fluoride, vinyl bromide, vinylidene chloride, 1-chloro - 1 - bromo-ethylene; methacrylonitrile; acrylamide and methacrylamide; alphachloroacrylamide; or monoalkyl substitution products thereof, methylvinyl ketone; vinyl carboxylates, such as vinyl acetate, vinyl chloroacetate, vinyl propionate, and vinyl stearate; N-vinylimides, such as N-vinylphthalimide and N-vinylsuccinimide, methylene malonic esters, itaconic acid and itaconic esters; N-vinylcarbazole, vinyl furane; alkyl vinyl esters; vinyl sulfonic acid; ethylene alpha, beta-dicarboxylic acids or their anhydrides or derivatives, such as diethylcitraconate, diethylmesacnate, styrene, vinyl naphthalene; vinyl-substituted tertiary heterocyclic amines, such as the vinylpyridines and alkyl-substituted vinylpyridines, for example, 2-vinylpyridine, 4-vinylpyridine, 2-methyl-5-vinylpyridine, etc.; 1-vinylimidazole and alkyl-substituted 1-vinylimidazoles, such as 2-, 4-, or 5-methyl-1-vinylimidazole, and other >C=C< containing polymerizable materials.

In the papermaking operation, the polyacrylonitrile particles behave as an inert mineral filler, and are retained in the decor paper web to about the same degree as mineral fillers such as titanium dioxide. Typically, retention of both the resin particles and titanium dioxide will range from 86 to 90%.

Because the decor paper of this invention is not re-wetted in a subsequent resin impregnating step, greater latitude in paper-making operations is possible.

For example, it is not necessary to incorporate wet strength properties into the decor, and pressing and calendering of the paper to a high degree is possible without regard to porosity and/or resin impregnating properties. Refining or beating of the pulp can be carried to a lower freeness, if desired, without concern for a non-existent subsequent impregnating operation. Thus printing characteristics of the decor can be improved by adjustment of papermaking variables in a manner which would normally adversely affect resin impregnating properties.

After printing, if desired, the decor so produced is ready to laminate. A sheet thereof is placed over the desired number of core stock sheets and an overlay placed over the decor, as shown in FIG. 1. This assembly is placed in a press and pressed at about 1000 to 1500 lb. per sq. in. and a temperature of from 270°F. to 297°F. for about 20 minutes. Generally, heating and pressing cycles required for curing and bonding prior art decor, core stock and overlays are satisfactory for use with the decor of this invention. Time, temperature and pressure requirements are those imposed by the phenolic and aminoplast resins in the assembly, which are more than adequate to achieve the flow and consolidation of the particles of polyacrylonitrile resin present in the decors of this invention. The resultant laminate is a unitary structure which is suitable for use in table and counter tops or the like.

The product and process of the invention will be further illustrated by the following examples:

EXAMPLE I

Ready-to-laminate decor papers were prepared from a furnish of 50.6% bleached wood pulp
30.0% titanium dioxide
19.4% polyacrylonitrile resin powder The wood pulp was dispersed in water first, followed by addition of the titanium dioxide which was thoroughly mixed with the wood pulp over a period of about 15 minutes. The polyacrylonitrile resin was then added as a water suspension of solid particles of the resin which had previously been ground to a particle size ranging from 1 to 3 microns. Alum was then added to give a pH of 4.5, followed by addition of ammonia to yield a pH of 6.5.

Next, the pulp, filler and resin slurry was refined to 450 ml Canadian Standard Freeness, diluted, and delivered to the head box of a fourdrinier papermachine. Basis weight was adjusted to about 65 lb. per 3000 sq. ft.

Operation of the machine was normal with no problems evident from the addition of the polyacrylonitrile resin powder. During the run, refining was increased to reduce freeness to 385 ml C.S.F., and wet pressing and calendering were increased to produce a Sheffield smoothness (felt or top side) of about 105, compared to a value of about 125 on the first part of the run. Near the end of the run, sodium bicarbonate buffer solution was added to the wet formed web on the wire section of the papermachine to adjust press cure time when later pressed into laminates. A retention aid and a minor amount of wet strength resin were added continuously during the machine run. It was found that broke or waste from the machine, produced during the run, could be repulped and recycled, up to a level of 90%, without adverse effects. The four separate decors produced had the following properties:

|  | A | B | C | D |
|---|---|---|---|---|
| Basis Wt., lb. (24×36–500) | 65.1 | 64.8 | 64.2 | 64.5 |
| Caliper, mils | 4.9 | 4.8 | 4.6 | 4.7 |
| Tensile, M.D., gm/in | 7100 | 8040 | 8280 | 7220 |
| Wet Tensile, M.D., gm/in | 1200 | 1220 | 600 | 650 |
| Ash, % | 26.5 | 26.0 | 25.1 | 24.1 |
| Smoothness (Top) Sheffield | 122 | 114 | 105 | 98 |
| Machine Speed, f.p.m. | 250 | 303 | 303 | 303 |
| Freeness, C.S.F. | 450 | 385 | 350 | 350 |
| Sodium bicarbonate, lb./br. | — | — | 28.4 | 32.6 |
| Broke, % | — | — | 20.0 | 90 |

The ready-to-laminate decors A, B, C and D were made into laminates in the laboratory using 7 sheets of unbleached kraft core stock containing 30% "B" stage phenolic resin, one sheet of decor, and overlays containing 65 and 74% melamine aldehyde resin. Pressing was at 1400 psi, to a maximum temperature of 285°F., for 20 minutes. After cooling, the resultant laminates were tested, using NEMA standard procedures as indicated, with the following results:

|  | A |  | B |  | C |  | D | Type C Spec. (NEMA) |
|---|---|---|---|---|---|---|---|---|
| Overlay resin, % | 74 | 65 | 74 | 65 | 74 | 65 | 74 | — |
| Resistance to Boiling Water (NEMA LD1-2.03) | OK | OK | OK | OK | OK | OK | OK | OK |
| Resistance to Heat (NEMA LD1-2.02) | OK | OK | OK | OK | OK | OK | OK | OK |
| Resistance to Cigarette burn, sec. (NEMA LD1-2.04) | 107 | 136 | 110 | 129 | 121 | 124 | 118 | 75 |
| Postforming, ½" R (NEMA LD1-2.11) | OK | OK | OK | OK | OK | OK | OK | ¾" OK |
| Impact Resistance (NEMA LD1-2.15) | 40" | 40" | 38" | 38" | 38" | 40" | 34" | 24" |
| Dimensional Stability*M.D. | — | 0.7% | — | — | — | — | — | <1.1 |
| (NEMA LD1-2.08) C.D. | — | 0.3% | — | — | — | — | — | <1.4 |

*Gross Dimensional Change, %

An examination of the data shows that the laminates of the invention meet all NEMA Specifications for Type C post forming laminates.

EXAMPLE II

Decor papers A and C of Example I were printed with one and two color designs, and converted into 1/16 inch thick laminates in a trial run on commercial sized presses, producing sheets 4 ft. by 8 ft. in size. Both smooth and textured surface finishes were produced.

These laminates were made with seven sheets of 114 lb/3000 sq. ft. of unbleached kraft core stock containing 31.5 to 32.9% B stage phenolic resin, one sheet of decor and 1 sheet of overlay containing 65.2% of melamine aldehyde resin. The pressing was carried out at 1400 psi for 67 minutes. Of this 67 minutes approximately 20 minutes were at a temperature in excess of 275°F. with a peak temperature of 292°F.

Tests on the finished laminates showed the following, using NEMA standard test methods except for the blister test and craze resistance test.

An examination of the data shows that, except for caliper, all NEMA specifications for Type A general purpose laminates are fully met or exceeded. An additional sheet of core stock would correct this, and in any event, it is unrelated to laminate properties associated with the kind and amount of resin in the decor layer.

Of particular significance are the resistance to heat, cigarette burn resistance and the blister test, all of which are surprising results, since the decor used has only one-half the conventional amount of resin, yet internal bonding of the decor after pressing is fully up to specifications.

| Decor used | A | A | C | C | NEMA Spec. Type A |
|---|---|---|---|---|---|
| Finish | Smooth | Textured | Smooth | Textured | |
| Caliper, mils | 54 | 56 | 56 | 54 | 62±5 |
| Resistance to boiling H₂O | OK | OK | OK | OK | OK |
| Resistance to heat | OK | OK | OK | OK | OK |
| Resistance to cigarette burn, sec. | 111 | 113 | 121 | 126 | 110 |
| Impact resistance | +40" | +40" | +40" | +40" | >36" |
| Dimensional stability M.D. | 0.03 | 0.18 | 0.13 | 0.21 | <0.5 |
| (Gross change)C.D. | 0.35 | 0.34 | 0.43 | 0.33 | <0.9 |
| Blister Test*, sec. above 350°F. | 20 | 14 | 18 | 17 | (>10) |
| Craze Resistance**, cycles | 8 | OK 10 | 6 | OK 10 | (6 min.) |
| Color Fastness to light, hrs. (NEMA LD1-2.06) Color | 48 | 48 | 48 | 48 | 48 |
| Change | None | None | None | None | Sl. OK |
| Surface Change | None | None | None | None | None |
| Resistance to boiling water (NEMA LD1-2.07) | | | | | |
| Wt. inc., % | 7.1 | 5.8 | 5.0 | 6.1 | <10% |
| Thickness Inc., % | 4.7 | 3.6 | 3.7 | 4.9 | <10% |
| Water Swell (NEMA LD1-2.12) | | | | | |
| Wt. Inc., % | 11.3 | 10.2 | 8.5 | 9.6 | — |
| Thickness Inc., % | 9.3 | 9.1 | 7.5 | 8.6 | — |

Values in ( ) are not NEMA Specifications
*Blister test: Time in seconds to produce a blister after heating to a surface temperature of 350°F., using a radiant heater and fixed geometry.
**Craze resistance: Expressed as the number of cycles of (a) 2-hour exposure to steam at atmospheric pressure and (b) drying and examination. Results are reported as the number of cycles to produce slight crazing of the surface.

EXAMPLE III TO VI

These Examples show results obtained with different amounts of polyacrylonitrile resin particles of two different particle size ranges. After producing the decor papers of the various examples, they were made into laminates according to the method and construction set forth in Example I. Tests on the finished laminates showed the following:

| Example No. | III | IV | V | VI |
|---|---|---|---|---|
| Basis Wt., lb./3000 sq. ft. | 65 | 65 | 65 | 65 |
| Bleached wood pulp | 50 | 50 | 45 | 53 |
| Titanium dioxide | 30 | 30 | 30 | 32 |
| Polyacrylonitrile resin 2–7$\mu$ | 20 | | | |
| Polyacrylonitrile resin 1–3$\mu$ | | 20 | 25 | 15 |
| Cigarette resistance, sec. | 100 | 117 | 116 | 113 |
| Impact resistance | +40″ | +40″ | +40″ | +40″ |
| Heat resistance | OK | OK | OK | OK |
| Blister test | 17 | 13 | 15 | 20 |
| 2 hr. Water Boil-Wt. Inc. % | 4.0 | 3.7 | 3.2 | 3.9 |
| Thickness Inc. % | 0 | 2.0 | 2.0 | 4.0 |
| Craze, No. of cycles V. Sl. | 7 | 8 | 6 | — |
| Slight | — | — | 8 | 6 |
| Crazed | 8 | 9 | 9 | 8 |
| Gross Dimensional Change M.D. % | 0.22 | 0.53 | 0.20 | 0.22 |
| C.D. % | 0.65 | 0.97 | 0.55 | 0.51 |
| Water Swell-18 hrs. 70°, Wt.Inc. | 7.0 | 6.1 | 5.5 | 6.2 |
| Thickness Inc. | 14.2 | 7.7 | 8.0 | 12.0 |

The particulate polyacrylonitrile resin used in Examples III to VI was obtained by wet grinding of a slurry of resin particles having an initial size ranging from 10 to 50 microns, by passage through an attrition mill. Prior to grinding the particles are compact and essentially spherical in shape. The action of the attrition mill chops the spheres into smaller, randomly shaped particles in a range of sizes. The 2–7 micron size was obtained by one pass through the mill, while two passes yielded a size range of 1–3 microns.

Examination of the data shows that, within narrow limits, all Examples III to VI resulted in acceptable laminates. Note that swelling after 18 hours in 70°F. water showed greater thickness increases for Examples III and VI, indicating that water was penetrating into the laminate structure to a higher degree than for Examples IV and V. While this test uses a NEMA standard method, there is no specification related to it for either Class A or Class C laminates. These examples indicate that resin content in the range of 15 to 25% had little effect on laminate properties, while the two different particle sizes show little or no difference in laminate properties.

EXAMPLES VII TO IX

For many decorative uses, relatively dark colors and patterns such as wood grains are desired. For these applications, a relatively low basis weight decor is acceptable. The high opacity and higher basis weight needed to mask the dark colored core stock to produce bright whites is no longer a factor for these darker colors. These Examples show the laminate properties obtained when using varying amounts of polyacrylonitrile resin in a decor of 52 lb./3000 sq. ft. basis weight. pressed and sheets of creped kraft compared Papermachine runs were made generally following the procedures of Example I, using varying amounts of the resin ground to a particle size range of 1 to 5 microns. Ready-to-laminate decor papers so obtained were made into laminates for both NEMA Type A and C according to the procedures of Example I, using an overlay containing 69% of aminoplast resin. Two laminates were made from each decor, one pressed and cured for NEMA Type A and one for NEMA Type C. Additionally, for Type C (postforming) laminates, the bottom two sheets of core stock were replaced with 2 phenolic impregnated creped kraft paper layers. Pressing conditions for the Type C laminates were 1000 psi pressure for 34 minutes as compared to 1400 psi for 40 minutes for Type A, with temperature the same for both. The following results were obtained:

| Example | VII | VIII | IX |
|---|---|---|---|
| Furnish - % by weight | | | |
| Softwood pulp 325 CSF | 26 | 26 | 28 |
| Hardwood pulp 325 CSF | 50 | 54 | 55 |
| Titanium Dioxide | 4 | 6 | 7 |
| Polyacrylonitrile resin (1–5$\mu$) | 20 | 14 | 10 |
| Starch | 0.5 | 0.5 | 0.5 |
| Decor Properties | | | |
| Basis Weight-lb./3000 sq. ft. | 53.5 | 52.5 | 52.0 |
| Caliper, mils | 5.48 | 5.00 | 4.96 |
| Smoothness, Sheffield, felt | 227 | 198 | 182 |
| Type A Laminate Tests | | | |
| Resistance to boiling water | OK | OK | OK |
| Resistance to heat | OK | OK | OK |

| Example | VII | VIII | IX |
|---|---|---|---|
| Impact resistance, in. | +40 | +40 | +40 |
| Res. to cigarette burn, sec. | 141 | 150 | 143 |
| Blister test,* sec. over 313°F | 47.9 | 47.1 | 47.7 |
| Resistance to boiling water, 2 hr. | | | |
| % Weight increase | 7.7 | 7.6 | 7.1 |
| % Thickness increase | 8.3 | 9.4 | 8.0 |
| Type C Laminate Tests | | | |
| Cigarette burn, sec. | 116 | 112 | 116 |
| Blister test,* sec. over 313°F | 54.0 | 55.4 | 52.5 |
| Postforming ½″ radius | 8 | 8 | 8 |
| ⅜″ radius | 8 | 8 | 8 |
| ¼″ radius | 6 | 4 | 7 |

*Blister test conditions were modified from those used in Example II, and are reported as the time in seconds to produce a blister after heating to a surface temperature of 313°F, using a radiant heater and fixed geometry such that the temperature of 313°F. is reached in 40 to 45 seconds.

Postformed test specimens were rated on a subjective scale of 1 to 8, with 8 representing a bend of the indicated radius showing no crazing or other adverse effects and 1 represents a complete failure. Generally speaking, a rating of 7 is acceptable for most applications, while 6 shows objectionable crazing in the area of the bend.

Examination of the data reveals that, at 52 to 53.5 lb./3000 sq. ft. basis weight, a decor with only 10% of polyacrylonitrile resin, incorporated in a laminate, meets NEMA standards, for both Type A and Type C laminates. Tests which relate to internal bonding of the laminates (resistance to heat and to boiling water, cigarette burn resistance, the blister test and the resistance to boiling water for 2 hours) all show that at this basis weight, adequate bonding of the laminate is achieved with polyacrylonitrile content of the decor as low as 10%.

EXAMPLES X TO XII

Examples VII to IX were repeated, except that the basis weight of the decor was adjusted to 37 to 38 lb./3000 sq. ft., with the following results:

The results using 37 to 38 lb./3000 sq. ft. decor, with polyacrylonitrile resin content ranging from 10 to 20%, are in good agreement with those obtained with 52 to 53.5 lb./3000 sq. ft. (see Examples VII to IX).

Other samples of the ready-to-laminate decors of Examples VII to XII were printed prior to preparing Type A laminates therefrom. Generally, it was observed that the lower basis weight decors at the lower polyacrylonitrile contents showed somewhat smoother surfaces and somewhat better printing quality. However, all were judged to be commercially acceptable.

EXAMPLES XIII TO XV

The decor papers of these examples were prepared according to the method of Example I, using 20% by weight of polyacrylonitrile resin particles in each case. In Example XIII, the resin particles were unground (size range 10 to 50 microns diameter); in Example XIV the resin particles were ground for 1 hour in an attrition mill, and in Example XV they were ground for 8 hours in an attrition mill.

The resulting decor papers were made into NEMA Type A and Type C laminates according to the procedures of Examples VII to IX, and the laminates then tested. The following results were obtained:

| Example | X | XI | XII |
|---|---|---|---|
| Polyacrylonitrile resin(1–5μ), % | 20 | 14 | 10 |
| Decor Properties | | | |
| Basis wt., lb./3000 sq. ft. | 37.0 | 38.0 | 37.5 |
| Caliper, mils | 3.94 | 3.72 | 3.48 |
| Smoothness, Sheffield, sec. | 200 | 153 | 128 |
| Type A Laminate Tests | | | |
| Resistance to boiling water | OK | OK | OK |
| Resistance to heat | OK | OK | OK |
| Impact resistance, in. | +40 | +40 | +40 |
| Resistance to cigarette burn, sec. | 145 | 133 | 130 |
| Blister test, sec. over 313°F. | 45.7 | 44.9 | 47.2 |
| Resistance to boiling water, 2 hr. | | | |
| Wt. increase, % | 7.4 | 7.8 | 7.2 |
| Thickness increase, % | 7.2 | 9.4 | 8.4 |
| Type C Laminate Tests | | | |
| Cigarette burn, sec. | 117 | 119 | 125 |
| Blister test, sec. over 313°F. | 55.0 | 54.7 | 51.8 |
| Postforming ½" radius | 8 | 8 | 8 |
| ⅜" radius | 8 | 8 | 8 |
| ¼" radius | 4 | 6 | 5 |

| Example | XIII | XIV | XV |
|---|---|---|---|
| Furnish | | | |
| Bleached wood pulp, % | 76 | 76 | 76 |
| Titanium dioxide, % | 4 | 4 | 4 |
| Polyacrylonitrile resin (10 to 50μ) | 20 | — | — |
| Polyacrylonitrile resin (2 to 10μ) | — | 20 | — |
| Polyacrylonitrile resin (1 to 3μ) | — | — | 20 |
| Paper Tests | | | |
| Basis Wt., lb./3000 sq. ft. | 65.5 | 66.5 | 64.0 |
| Caliper, mils | 6.9 | 6.7 | 6.2 |
| Porosity, sec. for 400 ml. | 33.2 | 46.0 | 82.8 |
| Smoothness, Sheffield | 220 | 220 | 180 |
| Type A Laminate Tests | | | |
| Cigarette burn, sec. | 130 | 148 | 135 |
| Blister test, sec. over 313°F. | 51.0 | 51.0 | 51.2 |
| Resistance to boiling water | OK | OK | OK |
| Resistance to heat | OK | OK | OK |
| Impact resistance, in. | +40 | +40 | +40 |
| Resistance to boiling water, | | | |
| 2 hr. Wt. Inc., % | 7.7 | 7.1 | 7.0 |
| Thickness Inc., % | 10.1 | 8.1 | 8.1 |
| Type C Laminate Tests | | | |
| Cigarette burn, sec. | 135 | 133 | 114 |
| Blister test, sec. over 313°F | 43.0 | 59.0 | 51.0 |
| Impact resistance, in. | +40 | +40 | +40 |
| Postforming, ½" radius | 8 | 8 | 8 |
| ⅜" radius | 8 | 8— | 8 |
| ¼" radius | 6+ | 6— | 6+ |

The Sheffield smoothness test (where the lower numbers are the smoother surfaces) reflects the effect of resin particle size, the finest particles giving the smoothest paper surfaces.

Caliper or thickness of the papers shows the coarse resin to yield the thickest paper, with progressive decrease to the finest resin particle paper.

Porosity tests on the paper also show the coarse resin to give a more porous sheet and a progressive decrease to the finest resin particle paper.

These effects of resin particle size on paper properties are those to be expected. These differences largely disappear after the decor papers are incorporated into laminates, all of them yielding both Type A and Type C laminates which meet the appropriate NEMA specifications.

Test printing of the decor papers of these examples showed print quality to improve as resin particle size decreased. These papers were produced under identical papermachine pressing and calendering conditions, and the observed printing quality differences are those to be expected.

In the following Examples, the improvement in printing quality resulting from different degrees of calendering was investigated.

EXAMPLES XVI TO XX

In these examples a decor paper containing 50% bleached wood pulp, 30% titanium dioxide filler and 20% of particulate polyacrylonitrile resin of a 10 to 50 micron particle size was subjected to different calendering conditions, and the resultant papers, printed and made into Type A laminates. The procedures of Example I were followed, except that the entire furnish of pulp, filler and resin was beaten together in a beater for 15 minutes and then given one pass through a jordan prior to the papermaking operation. The following test results were obtained;

While emphasis in the foregoing has been on meeting NEMA specifications for Type A - General Purpose and Type C - Post Forming laminates, it should be self evident that all the decor papers of Examples I-XX meet the less stringent specifications for NEMA Type B - Vertical Surface laminates.

What is claimed is:

1. A unitary plastic laminate consisting essentially of a core impregnated with a phenolic resin, a decor sheet and an overlay impregnated with an aminoplast, said decor sheet having from 10 to 25% by weight of particulate polyacrylonitrile resin uniformly dispersed therein during manufacture thereof, said polyacrylonitrile resin being a copolymer of 85 to 98% by weight of acrylonitrile and 15 to 2% by weight of an ethylenically unsaturated monomer copolymerizable therewith, said polyacrylonitrile having a molecular weight ranging from 60,000 to 90,000.

2. The laminate of claim 1 wherein said polyacrylonitrile resin has a particle diameter ranging from 1 to 50 microns.

3. The laminate of claim 1 wherein said decor sheet carries a printed pattern.

4. A decor paper adapted for incorporation as a decorative layer in a plastic laminate together with a core impregnated with a phenolic resin and an overlay impregnated with an aminoplast, said decor paper containing from 10 to 25% by weight of particulate polyacrylonitrile resin uniformly dispersed therein during manufacture thereof, said polyacrylonitrile resin being a copolymer of 85 to 98% by weight of acrylonitrile and 15 to 2% by weight of an ethylenically unsaturated monomer copolymerizable therewith, said polyacrylonitrile having a molecular weight ranging from 60,000 to 90,000.

| Example | XVI | XVII | XVIII | XIX | XX |
|---|---|---|---|---|---|
| Calendering | | | | | |
| No. of passes through nip | 0 | 1 | 3 | 1 | 3 |
| Nip pressure, lb/lin. in. | — | 300 | 300 | 850 | 850 |
| Paper Properties | | | | | |
| Basis Wt., lb./3000 sq. ft. | 62 | 62 | 62 | 62 | 62 |
| Caliper, mils | 6.3 | 5.0 | 4.6 | 4.9 | 4.5 |
| Porosity, sec. for 400 ml. | 61.2 | 220 | 272 | 278 | 329 |
| Smoothness, Sheffield | 265 | 177 | 159 | 168 | 165 |
| K & N Ink receptivity[1] | 29.3 | 34.8 | 38.4 | 35.3 | 38.8 |
| Ink Sensitivity, %[2] | 33.1 | 39.6 | 43.3 | 39.7 | 44.4 |
| Laminate Tests (Type A) | | | | | |
| Blister test, sec. over 313°F. | 55.0 | 60.0 | 61.8 | 58.0 | 58.6 |
| Cigarette burn | 132 | 133 | 130 | 130 | 136 |
| Resistance to heat | OK | OK | OK | OK | OK |
| Impact resistance | +40 | +40 | +40 | +40 | +40 |
| Resistance to boiling water-2 Hr. | | | | | |
|   Wt. increase, % | 7.0 | 6.7 | 6.1 | 6.2 | 6.2 |
|   Thickness inc., % | 7.2 | 9.1 | 6.0 | 8.2 | 7.1 |
| Print Quality[3] | 5 | 3 | 2 | 4 | 1 |

Notes:
[1]K & N Ink smeared on paper for 30 sec., wiped off and reflectance measured with a Bausch and Lomb Opacimeter using white body.
[2]Ratio of reflectance of inked area to uninked area of paper.
[3]Arbitrary scale of 1-best, 5-poorest.

From these examples, it is apparent that calendering can more than compensate for any loss of print quality from use of 10-50 micron polyacrylonitrile resin particles.

5. The decor paper of claim 4 wherein said polyacrylonitrile resin has a particle diameter ranging from 1 to 50 microns.

* * * * *